United States Patent
Finger et al.

(10) Patent No.: US 10,313,187 B2
(45) Date of Patent: Jun. 4, 2019

(54) ENHANCED DYNAMIC DEVICE CONFIGURATION

(71) Applicant: T-Mobile USA, Inc., Bellevue, WA (US)

(72) Inventors: Joshua Patrick Finger, Covington, WA (US); Yasmin Karimli, Kirkland, WA (US); Gunjan Nimbavikar, Bellevue, WA (US); Shelby Seward, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 15 days.

(21) Appl. No.: 15/476,635

(22) Filed: Mar. 31, 2017

(65) Prior Publication Data

US 2018/0287863 A1 Oct. 4, 2018

(51) Int. Cl.
*H04L 12/24* (2006.01)
*H04W 8/18* (2009.01)

(52) U.S. Cl.
CPC ............ *H04L 41/082* (2013.01); *H04W 8/18* (2013.01)

(58) Field of Classification Search
CPC .............................. H04L 41/0852; H04W 8/18
See application file for complete search history.

(56) References Cited

U.S. PATENT DOCUMENTS

| | | | | |
|---|---|---|---|---|
| 8,121,913 B2* | 2/2012 | Bracken | ................. | G06Q 20/04 705/33 |
| 8,201,162 B2* | 6/2012 | Okachi | .................... | G06F 8/65 709/201 |
| 8,255,281 B2* | 8/2012 | Benson | .................. | G06Q 10/00 705/26.1 |
| 8,260,277 B2* | 9/2012 | Dennert | .................. | H04W 8/18 455/417 |
| 8,437,745 B2* | 5/2013 | Theppasandra | ......... | H04W 8/12 370/338 |
| 9,069,607 B1* | 6/2015 | Gopalakrishna Alevoor | | ............. G06F 9/45558 |
| 9,100,854 B2* | 8/2015 | Tapia | ................ | H04W 28/0268 |
| 9,516,491 B2* | 12/2016 | Lihosit | .................. | H04W 8/183 |
| 9,641,956 B2* | 5/2017 | Fong | .................. | H04W 4/50 |
| 9,660,998 B1* | 5/2017 | Sethi | ..................... | H04L 63/101 |
| 9,678,769 B1* | 6/2017 | Scott | ......................... | G06F 9/455 |
| 9,866,988 B2* | 1/2018 | Lihosit | .................. | H04W 4/001 |
| 10,136,323 B2* | 11/2018 | Stocker | ................. | H04W 76/10 |
| 2004/0002383 A1* | 1/2004 | Lundy | ..................... | G07F 17/32 463/42 |
| 2008/0120124 A1* | 5/2008 | Zoeckler | ................ | G06Q 10/10 705/1.1 |
| 2009/0037900 A1* | 2/2009 | von Khurja | .............. | G06F 8/654 717/173 |
| 2009/0319643 A1* | 12/2009 | Crisan | ................. | G06F 9/44505 709/221 |
| 2011/0239039 A1* | 9/2011 | Dieffenbach | ......... | H04L 41/082 714/4.1 |

(Continued)

*Primary Examiner* — Parth Patel

(74) *Attorney, Agent, or Firm* — Lee & Hayes, P.C.

(57) ABSTRACT

The disclosure provides a solution to dynamically configure a connected device using a stock keeping unit ("SKU") element associated with the connected device. A connected device includes a SKU element which stores identification of multiple service providers. The service provider IDs are associated with configuration templates which facilitate updating a configuration of the connected device with the service providers.

19 Claims, 4 Drawing Sheets

(56) References Cited

U.S. PATENT DOCUMENTS

| | | | | |
|---|---|---|---|---|
| 2012/0280813 A1* | 11/2012 | Ahluwalia | ............... | H04W 8/18 |
| | | | | 340/540 |
| 2012/0329521 A1* | 12/2012 | Jacobs | ................. | H04W 8/183 |
| | | | | 455/558 |
| 2013/0077534 A1* | 3/2013 | Hu | ...................... | H04L 41/5054 |
| | | | | 370/259 |
| 2015/0011210 A1* | 1/2015 | Drevon | .................. | H04W 8/10 |
| | | | | 455/435.2 |
| 2015/0222961 A1* | 8/2015 | Hardie | ................. | H04N 21/812 |
| | | | | 725/14 |
| 2015/0230104 A1* | 8/2015 | Liu | ...................... | H04W 24/10 |
| | | | | 455/418 |
| 2016/0028665 A1* | 1/2016 | Yan | ...................... | H04W 4/003 |
| | | | | 370/329 |
| 2016/0087833 A1* | 3/2016 | Donahue | ............... | H04L 41/082 |
| | | | | 709/221 |
| 2016/0164926 A1* | 6/2016 | Zehavi | ................... | H04W 8/20 |
| | | | | 455/432.1 |
| 2016/0353172 A1* | 12/2016 | Miller | ................... | G06F 3/0482 |
| 2017/0118575 A1* | 4/2017 | Craine | ................ | H04W 4/001 |
| 2018/0267944 A1* | 9/2018 | Lee | ..................... | G06F 17/2247 |

\* cited by examiner

ENHANCED DYNAMIC DEVICE CONFIGURATION

BACKGROUND

Device configuration may include remote distribution of software, applications, data and configuration settings for a connected device. A connected device may include any device that can access/be accessed through a network, including mobile terminals, tablet computers, smart appliances, connected home devices, etc.

As connected devices become more advanced and versatile in implementing various functions and applications, over-the-air (OTA) configuration has become increasingly important as new updates and services come on stream. At the meanwhile, previous/dated applications also accumulate on a connected device, which may consume system resources and contradict the operations/functions of new applications and/or settings. The problems are further complicated by the facts that a connected device may be used with different service providers and may include redundant software/firmware settings with the different service providers, which may not be readily removed.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The disclosure provides a solution to dynamically configure a connected device using a stock keeping unit ("SKU") element associated with the connected device. In the following detailed description, references are made to the accompanying drawings that form a part hereof, and in which are shown by way of illustration specific configurations or examples, in which like numerals represent like elements throughout the several figures.

1. Example Devices

Figure 1:
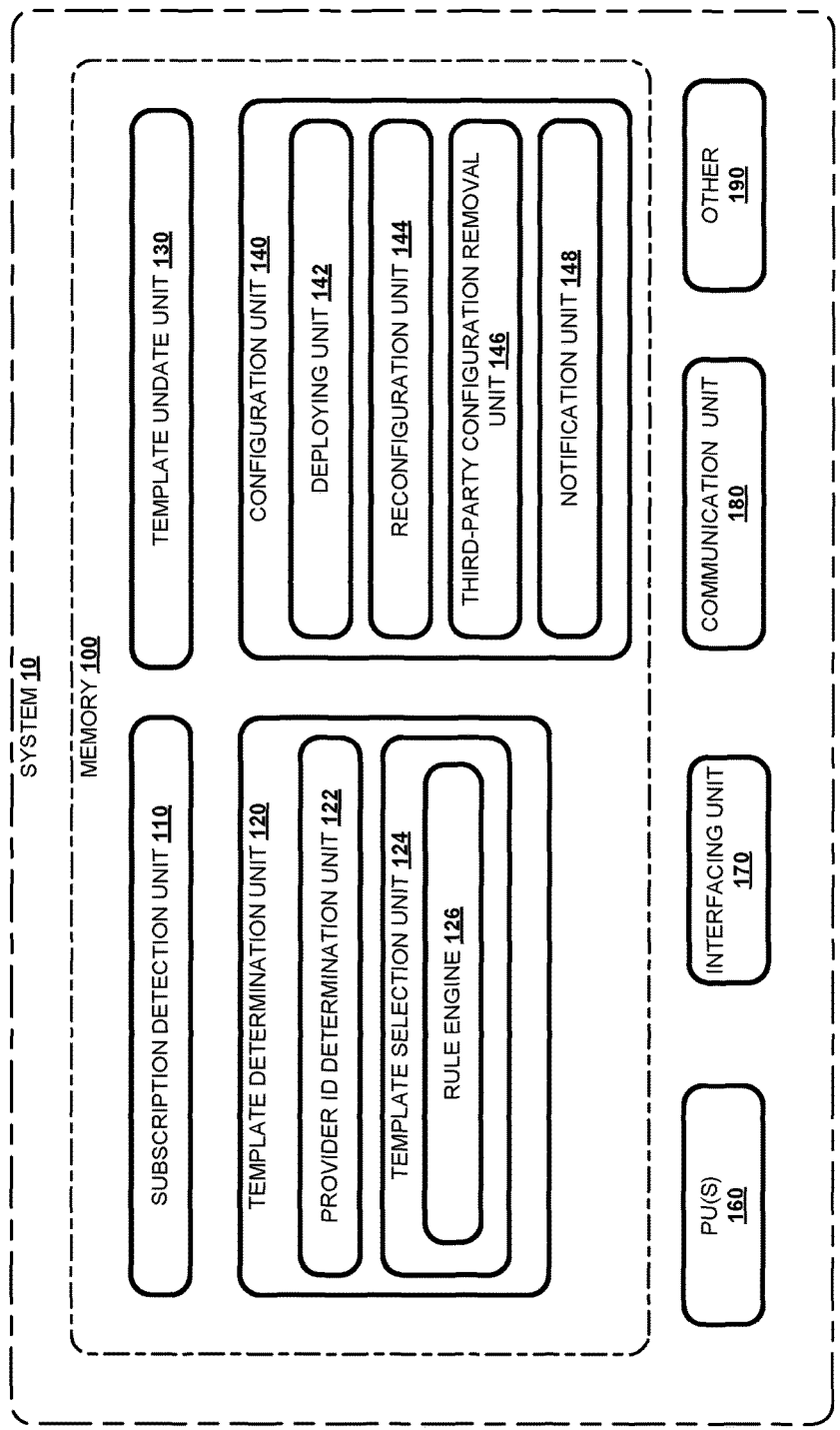
FIG. 1 illustrates an example system for configuring a connected device.

Referring to FIG. 1, an example system 10 for dynamically configuring a connected device is illustrated. As shown in FIG. 1, system 10 may include one or more memory 100 which stores computer executable instructions, which when executed by one or more processing units, configure the processing units and the related computing device(s) to implement a subscription detection unit 110, a template determination unit 120, a template update unit 130 and a configuration unit 140.

Template determination unit 120 may further include a provider ID determination unit 122 and a template selection unit 124 that includes a rule engine 126. Configuration unit 140 may further include a deploying unit 142, a reconfiguration unit 144, a third-party configuration removal unit 146 and a notification unit 148.

System 10 may also include one or more processing units (PU) 160, interfacing units 170, communication units 180 and/or other components 190.

It should be appreciated that although system 10 and the units thereof, e.g., subscription detection unit 110, template determination unit 120, template update unit 130 and configuration unit 140, are illustrated as a single system, it does not necessarily mean that all components of system 10 are physically or functionally located together within a single computing system. Any and/or all of the units illustrated in system 10 of FIG. 1 may be located on separate computing systems communicating and functioning together in a distributed computing environment.

Figure 2:
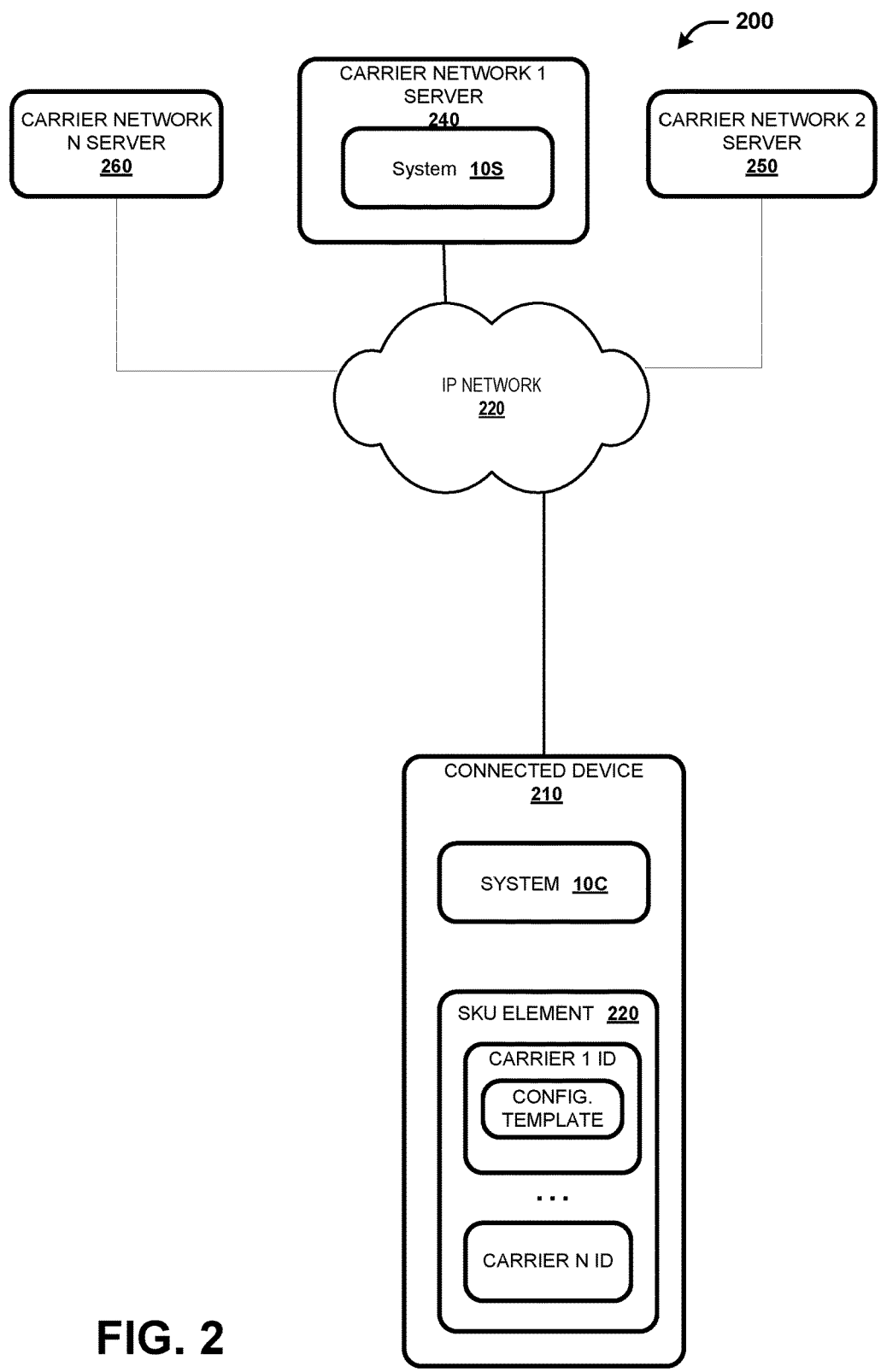
FIG. 2 illustrates an example operation environment of the example system of FIG. 1.

FIG. 2 illustrate an example operation environment 200 of system 10. Note that FIG. 2 illustrates system 10 as a distributed computing scheme within environment 200, which again is a non-limiting example of the implementation.

As shown in FIG. 2, some of the units of system 10 may reside on a connected device 210, referred to as client side sub-system 10C, and some other units of system 10 may reside on a server of a service provider, here for example, carrier network 1 server 240, referred to as server side sub-system 10S.

Connected device 210 may include a stock keeping unit (SKU) element 220. SKU element 220 may contain identification ("ID") of multiple service providers. A service provider may include any entity that may distribute software, applications, settings, parameters, and/or data to a connected device 210. That is, a service provider may include any entity that may update a configuration of connected device 210. Here for illustrative purposes only, a telecommunication carrier network(s) is used as an example of a service provider. For illustrative example, SKU element 220 of connected device 210 may include IDs for carrier networks 1 to N (referred to as "carrier ID" in FIG. 2 for simplicity). One or more of the carrier network IDs may include and/or associated with unique configuration template(s) respectively. In an example, connected device 210 may include a SKU element 220 that contains carrier IDs of multiple communication carriers. SKU element 220 may be accessed through a unified/standardized manner by multiple service providers, e.g., telecommunications carriers. It should also be appreciated that SKU element 220 may not necessarily be a single physical element, and may include multiple elements and may reside in/on multiple hardware/software layers of connected device 210. For example, SKU element 220 may function with various specific situations of dual-SIM, eSIM, and/or OS profiles.

SKU element 220 and the enclosed/associated configuration template(s) may be protected by information security measures and/or access control measures. In an example, the information security measures/access control measures may be rule based. For example, a rule may specify whether and/or how a third-party carrier network can access a configuration template associated with a carrier network ID stored in SKU element 220.

In FIG. 2, server sider sub-system 10S is illustrated, as an example, as residing on a server associated with a service provider, here carrier network 1 server. The disclosure is not limited by this example, and server sider system 10S may reside on a server not associated with any of the service provider and may be independent in providing configuration services to any and all service providers.

With subscription to, e.g., one of carrier networks, e.g., carrier network 1, connected device 210 may connect to a target server, e.g., carrier network 1 server 240 through IP network 220. IP network 220 may include any communication network that uses Internet Protocol (IP) to send and receive messages between one or more computing devices, including connected device 210, including, but not limited to, Ethernet, Cable Modems, DSL Modems, dial up modems, Wi-Fi, VPN connections, etc. For example, for a connected device 210 subscribed to a telecommunication carrier network, access to IP network 220 may be supported through evolved packet core(s) ("EPC"), GERAN (radio access network of GSM/GPRS) and UTRAN (radio access network of UMTS-based technologies WCDMA and HSPA) and non-3GPP accesses.

IP Network 220 is provided as an example for connected device 210 to communicate with a service provider. It should be appreciated that it is possible that connected device 210 communicate with a service provider through non-IP based network and such a situation is also included in the disclosure.

In an example, without valid subscription to a specific communication carrier network, some limited access to an access point of a carrier network may still be enabled for some functions. For example, connected device 210 may be configured to access an access point of carrier network 1 server 240 for device configuration/reconfiguration/configuration removal purposes.

Client side sub-systems 10C and server side sub-system 10S may function together in updating a configuration of connected device 210. The updating may include deploying a system configuration, updating a system configuration, removing an existing (or previous as the scenarios may apply) system configuration of the associated carrier network, for example, or another third-party carrier network.

It should be appreciated that any and all units of system 10 may be residing on either one of connected device 210 or carrier network server 240 and all scenarios are included in the disclosure. For illustrative purposes, the description herein may or may not specify a unit of system 10 to be residing in either one of connected device 210 and/or server 240, which are all non-limiting examples.

It should also be appreciated that a service provider may delegate some or all of the device configuration functions to a third party. As such, some or all component(s) of system 10 may be implemented/residing on/associated to the third party other than the service provider. For example, a telecommunication carrier company (operator of a carrier network) may delegate the device configuration function, e.g., the configuration of a connected device subscribed to the carrier network, to an OEM device manufacturer or a cloud based service company dedicated to providing device configuration services. For another example, a telecommunication carrier company (operator of a carrier network) may enter into partnership with another carrier operator such that the other carrier operator may have the delegation to configure special services when a connected device 210 roams to the service area of the other carrier operator.

Referring back to FIG. 1, subscription detection unit 110 may be configured to detect an updated subscription status of a connected device 210 with respect to a service provider. In an example, in a case that sub-system 10S associates with a carrier network server, e.g., carrier network 1 server 240, subscription detection unit 110 (either in system 10S or in system 10C) may be configured to detect an updated subscription status of connected device 210 to the carrier network which system 10S is associated with. In another example, subscription detection unit 110 may reside in connected device 210 and may detect updated subscription status with any service provider on a condition that the service provider ID is stored in SKU element 220.

Various approaches may be used by subscription detection unit 110 in detecting an updated subscription status of connected device 210 to a service provider and all are included in the disclosure. For example, the detecting the updated subscription status of connected device 210 with respect to a telecommunication carrier network may be based on one or more of a Mobile Station International Subscriber Directory Number (MSISDN), an International Mobile Subscriber Identity (IMSI), an International Mobile Equipment Identity (IMEI), a Subscriber Identity Module (SIM) ID, a Universal Integrated Circuit Card (UICC) ID, a Service Provider Name (SPN) ID or a Global Title (GT) ID associated with connected device 210 and/or a Home Location Register (HLR) message related to. For example, a network based "check IMEI" message may be used to detect a subscription status of a connected device 210. For another example, an HLR may process a signaling message (may be predetermined according an agreement/standard) to identify the message processing points to detect a subscription status of a connected device 210.

Any updates on the subscription status which are relevant to system configuration may be detected and all are included in the disclosure. For example, an update on the subscription status may include a new subscription to a service provider, e.g., carrier network 1, a termination with the service provider, an upgrade of the services with a service provider, a transfer from a third-party service provider to a current service provider, and/or a customization/personalization of the configuration of connected device 210.

Subscription detection unit 110 may check a subscription status of a connected device 210 based on specific events and/or may routinely for updates. For example, subscription detection unit 110 may check subscription status of a connected device 210 with a fixed interval/frequency, e.g., every 24 hours, for updates. The subscription update check may also be triggered by specific events like SIM card swap, and or change of location of the connected device 210. For example, if a connected device 210 is detected to be location in a foreign country, subscription detection unit 110 may detect whether connected device 210 is roaming to a third-party carrier network that is affiliated with the home carrier or not, which may be used in a configuration update of the connected device 210 for the roaming.

Template determination unit 120 may be generally configured to identify a configuration template associated with an identification of a service provider stored in SKU element 220 of connected device 210. A configuration template may include variables, properties and parameters for deploying, removing and/or updating a configuration of connected device 210 in relation to a subscription to a service provider. A configuration template may be preset or may be dynamically generated. Further, a configuration template may be selected/generated based on a rule. A rule may specify different security measures/access control policies.

In an example, the configuration template associated with a service provider ID may include multiple templates (or multiple sections of templates) including varied contents and access control measures. For example, the configuration template may include a deploying template for configuring connected device 210 with a service provider and a reconfiguration template for removing an existing configuration of the connected device 210 with the service provider. The configuration template may further include a third-party configuration removal template configured as a basis for a third-party service provider to remove an existing configuration of the connected device with the current service provider.

In an example, the configuration template may also include multiple templates for different situations/scenarios. For example, a telecommunication carrier network may have different configuration templates (e.g., contents) for different channels of selling/providing/marketing/branding the connected device under subscription to the carrier network. For another example, the configuration template may be grouped/differentiated based on wireless access points (or pass point) locations and/or PLMN locations and/or mobile country code. For example, a telecommunication carrier company may stipulate a specific configuration template for devices used in Europe and a different configuration for devices used in Asia. For example, different service items may be provided to subscriptions in Asia other than those subscribed in Europe.

The location based template differentiation may also relate to roaming. Configuration templates may provide different roaming services/fee schedule based on different roaming locations and/or different roaming carrier operators, e.g., whether affiliated with the home carrier operator or not.

In an example, the configuration is based on subscription status instead of/in addition to the connected device itself as a hardware software combination. For example, in a scenario of phone 2.0 device, which include multiple subscriptions/phone numbers for the same physical device, there may be multiple different configurations for the multiple subscriptions/phone numbers.

In an example, the third-party configuration removal template may include a different content than the reconfiguration template. That is, different sets of properties, parameters and/or variables may be accessible by a third-party service provider to remove an existing configuration of a first service provider than a removal operation by the first carrier network itself. The third-party configuration removal template may also include a different security measure than the reconfiguration template. For example, the third-party configuration removal template may not access proprietary software development kits and/or APIs.

A configuration template may be configured for use with any configuration of a connected device 210, including, but not limited to, functional configuration, settings, parameters, data, software installation, applications deployment, and/or graphics interface configurations. For example, the configuration may be related to the voice data, e-mail, Web-browsing, and inter-device communication of a connected device 210 within a carrier network. The configuration may also be related to an interface layer configuration for plug-in applications.

A configuration template may include specific modular structure of configurations to differentiate among different stacks/modules on connected devices 210. The differentiation may include those on the IP layer in addition to those on application and/or interface layers. For example, the configuration template may provide whitelisting/prioritizing services (e.g., MMS, Jansky, SMS, IR.94)/IPs/FQDNs). A configuration template may also provide overriding scanning algorithms as designed by default based on SIM.

Within template determination unit 120, provider ID determination unit 122 may be configured to determine a service provider ID stored in SKU element 220, which is related to the detected update of subscription status. In some scenarios, there might be multiple service provider IDs involved in the detected subscription status update. For example, in a case a connected device 210 is transferred from carrier network N to carrier network 1, IDs of both carrier network N and carrier network 1 may be identified. In an example, coalition between service providers may be resorted for a service provider to obtain IDs of other service providers stored in SKU element 220.

Within template determination unit 120, template selection unit 124 may be configured to identify a configuration template based on the determined service provider ID(s) and the detected subscription updates. There may be multiple configuration templates associated with a service provider ID for different types of subscription updates, and template selection unit 124 may be configured to select the appropriate one for the specific situation(s).

In an example, template selection unit 124 may also be configured to communicate with other service provider(s) to obtain/provide configuration templates. In an example scenario that a connected device 210 is transferred from carrier network N to carrier network 1, template selection unit 124 associated with carrier network 1 may communicate with carrier network N to obtain the relevant configuration template to remove the system configuration deployed by carrier network N. In another example, with some coalition agreement(s), template selection unit 124 may directly obtain a relevant configuration template, as associated with carrier network N ID stored in SKU element 220, to remove system configuration deployed by carrier network N.

Rule engine 126 of template selection unit 124 may apply a rule(s) in selecting a configuration template. The rules may specify any aspect of the template selection, and all are included in the disclosure. For example, rule engine 126 may specify which configuration template to provide to a third-party service provider for the third-party service provider to remove existing configuration deployed by the current/previous service provider. Rule engine 126 may also specify a deployment template to update the configuration of a connected device 210 based on the previous/existing configurations (versions) of connected device 210. In another example, rules may provide that the dynamic configuration function be deactivated for specific scenarios. For example, in a scenario that telecommunication services are provided through mobile base stations, e.g., drones providing cellular coverage, dynamic configuration may be deactivated to, e.g., effectively prioritize the resource allocation.

Template update unit 130 may be configured to directly update a configuration template(s) associated with a service provider ID stored in SKU element 220, based on, for example, inputs of the associated service provider.

Configuration unit 140 may be generally configured to update a configuration of a connected device 210 based on the configuration template(s) selected by template selection unit 124. Depending on the updated subscription status, the updating of the configuration may include, but not limited to, deploying a configuration, updating a configuration, removing at least partially a previous configuration deployed by a third-party service provider, and/or removing at least partially an existing configuration with the current service provider.

In an example, the configuration operation may include automatically activating an application program interface (API) on connected device 210 to enable a configuration application of the server, e.g., carrier network 1 server 240, to implement the updating of the configuration based on the identified configuration template(s).

Deploying unit 142 may be configured to deploy a configuration based on a deploying template. Any approaches to deploy a configuration is possible, and all are included in the disclosure. A deploying may involve a whole system configuration or may involve a partial system configuration. A system configuration deploying may happen when a connected device 210 is subscribed to a relevant service provider under a new subscription or when a connected device 210 updates, e.g., upgrades, an existing subscription with a relevant service provider.

Reconfiguration unit 144 may be configured to remove an existing configuration using a reconfiguration template. Any approaches may be used in the removing of a configuration, and all are included in the disclosure. A configuration removal may involve the whole system configuration or may involve a partial system configuration. A configuration removal may happen when a connected device 210 terminates a subscription with a relevant service provider. A system reconfiguration may also happen when a connected device 210 updates, e.g., upgrades, an existing subscription with a relevant service provider, which necessitates partial removal of the existing/previous system configuration.

Third party configuration removal unit 146 may be configured to remove an existing system configuration of a connected device 210 with a third-party service provider. The removal may be performed using a configuration template of the third-party service provider obtained by template selection unit 124. Depending on the policy of the third-party service provider, the configuration template of the third-party service provider may be directly retrieved from SKU element 220 or may be obtained through communication with the third-party service provider. In a situation that there is no available third-party configuration template, third party configuration removal unit 146 may use internal operation processes to remove third-party configurations. For example, template selection unit 124 may identify a configuration template to suppress and/or overlap the third-party configurations with newly deployed system configuration such that the third-party appears to be "removed".

Notification unit 148 may be configured to give notification to a party involved in a device configuration operation. A party involved in the device configuration operation may include, but not limited to, a user of the connected device 210 to be configured, a previous service provider whose configuration(s) is to be removed, etc. For example, notification unit 148 may function together with a portal application installed on connected device 210 to activate a push notification message for a user of the connected device either to agree or reject an upgrade of the configuration of the connected device.

2. Example Processes

Figure 3:
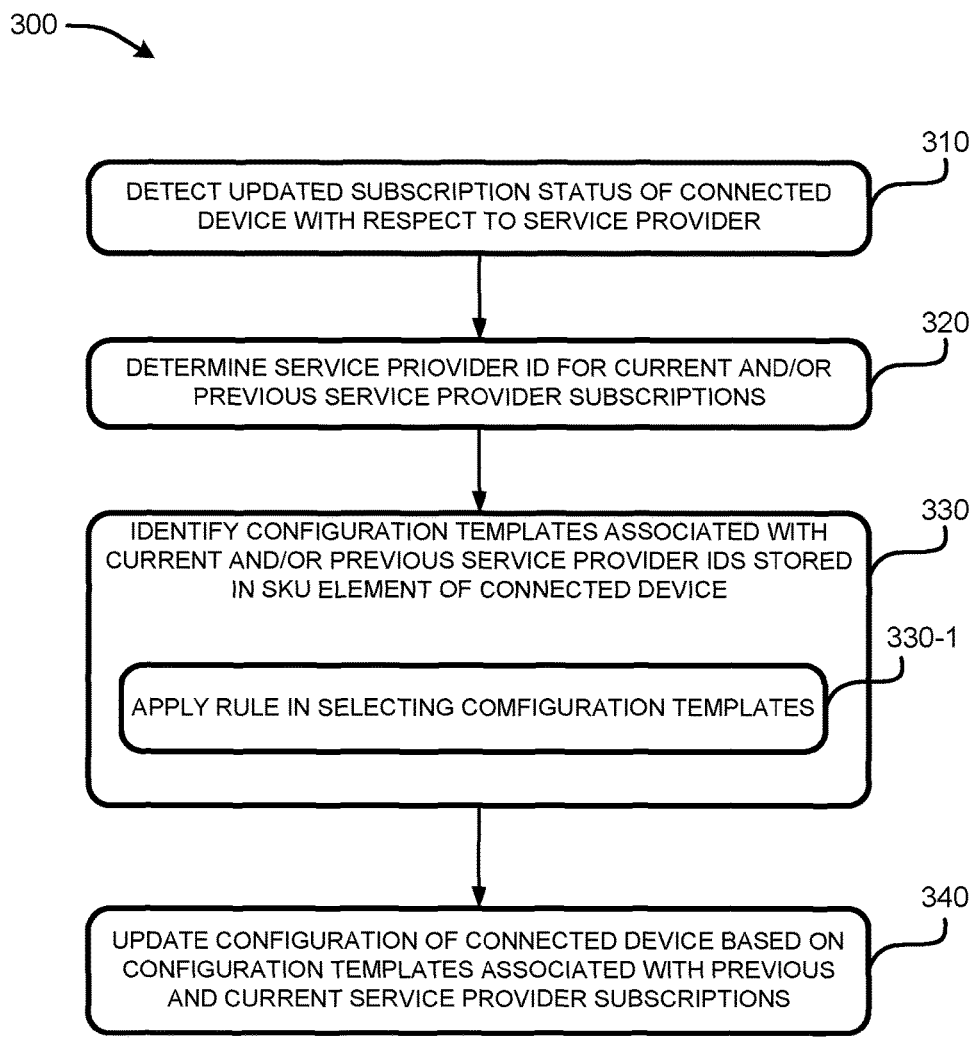
FIG. 3 illustrates an example operation process of the example system of FIG. 1.

Referring to FIG. 3, an example operation process 300 of system 10 is illustrated. In the following description, carrier network 1 is used as an illustrative example service provider where system 10 is associated with. It should be appreciated that it is not necessary that system 10 is specifically associated with any specific service provider and system 10 may be, for example, pre-installed on connected device 210 with agreements setup with multiple service providers, e.g., telecommunication carrier networks, and can function with the multiple service providers. System 10 may be an independent entity to provide system configuration services to other service providers. System 10, if not associated with a specific service provider, may work with multiple service providers on a tiered rule/authority levels for information security and/or access controls. For example, different service providers may give different authorities to system 10 to access configuration templates thereof.

In example operation 310, subscription detection unit 110 may detect an updated subscription status of a connected device 210 with respect to a service provider. Any updates on the subscription status which are relevant to system configuration may be detected and all are included in the disclosure. For an illustrative example, subscription detection unit 110 may detect that a connected device 210 terminates a subscription with carrier network 2 and opens a new subscription with carrier network 1 that system 10 is associated with.

In example operation 320, provider ID determination unit 122 may determine an ID stored in SKU element 220 for the current and/or previous service provider subscriptions of connected device 210, which is related to the detected update of subscription status. Following the illustrative example above, provider ID determination unit 122 may determine the IDs for carrier network 1 and carrier network 2 as current and previous carrier network subscriptions of connected device 210, respectively. If one of the current and/or previous carrier network does not have an ID stored in SKU element 220 of connected device 210, other approaches may be used for the configuration update, which does not limit the scope of the disclosure.

In example operation 330, template selection unit 124 may identify a configuration template(s) associated with current and/or previous service provider IDs stored in SKU element 220 and based on the detected subscription updates. There may be multiple configuration templates associated with a service provider ID for different types of subscription updates, and template selection unit 124 may select the appropriate one(s) for the specific scenario. Following the illustrative example above, template selection 124 may identify a deploying template of current carrier network 1 and a third-party configuration removal template of previous carrier network 2. As an illustrative example, system 10 is associated with carrier network 1, and template selection unit 124 may obtain the third-party configuration removal template of previous carrier network 2 either directly through SKU element 220 (if policy allows), or through communication with carrier network 2.

In sub-operation 330-1, rule engine 126 may apply a rule(s) in selecting a configuration template. For example, depending on different configuration template(s) obtained from third party previous carrier network 2, rule engine 126 of system 10 associated with carrier network 1 may provide different deploying templates to facilitate the deploying of the system configuration with carrier network 1. For example, the deploying templates may be selected based on the possibility to reduce the potential system conflicts against the remaining system configuration with carrier network 2, which may not be completed removed.

Figure 4A:
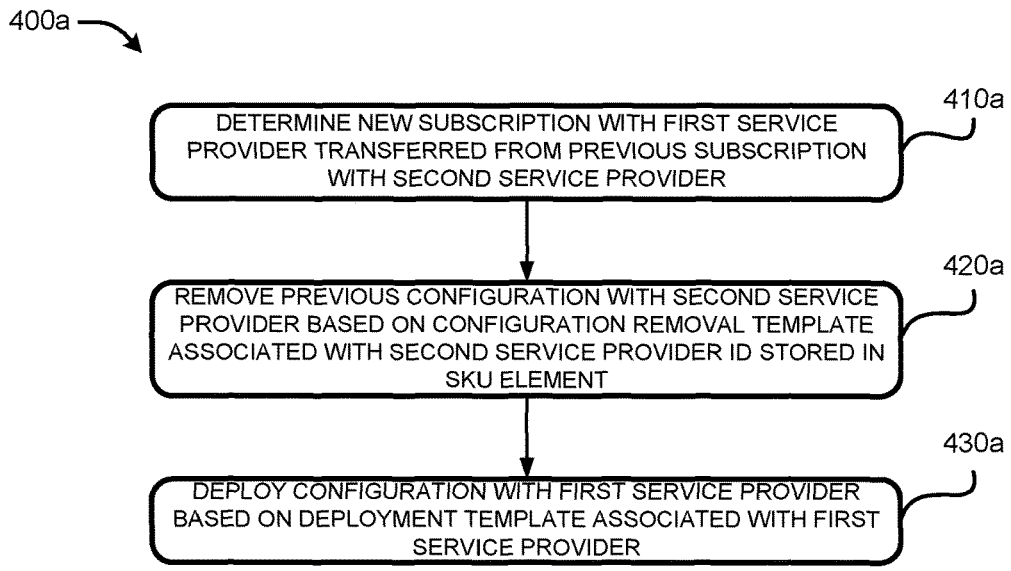
FIG. 4a-4c illustrate three example operation processes of the example system of FIG. 1.
Figure 4B:
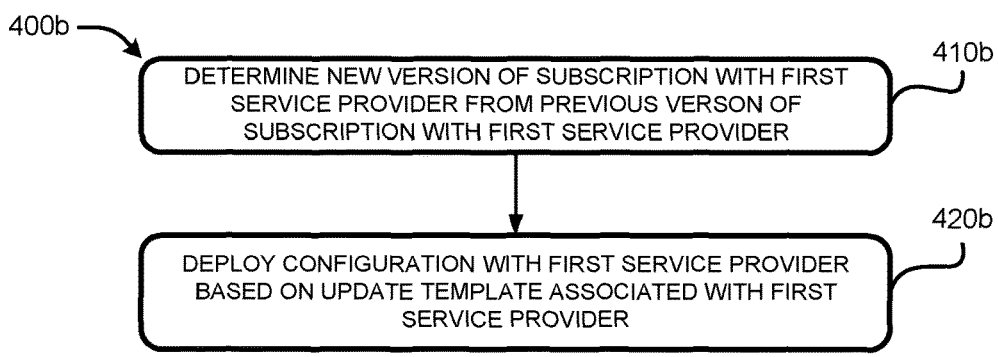
Figure 4C:
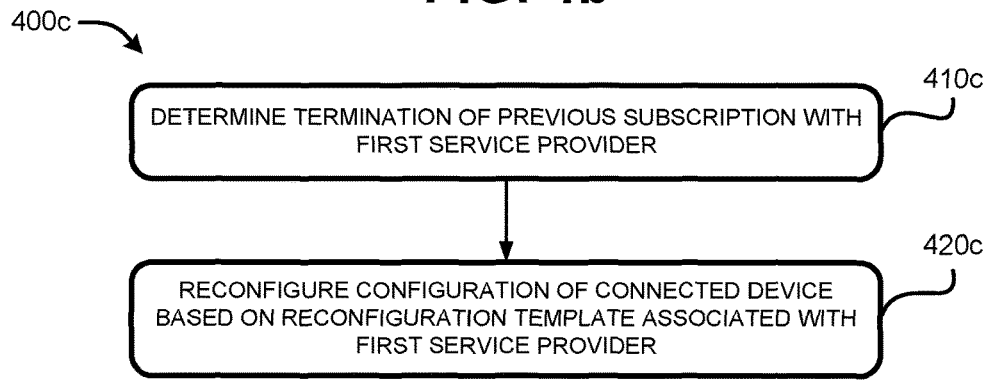

In example operation 340, configuration unit 140 may update a configuration of connected device 210 based on the configuration template(s) selected by template selection unit 124. For example, the updating the configuration may include automatically activating an application program interface (API) on connected device 210 to enable a configuration application of carrier network 1 server 240 to implement the updating of the configuration using the selected configuration templates. FIG. 4a-4c. illustrate three example detailed operations of example operation 340.

Referring to FIG. 4a, in example operation 410a, subscription determination unit 110 may determine that a new subscription of connected device 210 with a service provider, e.g., carrier network 1, transferred from previous subscription with another service provider, e.g., carrier network 2, following the illustrative example above.

In example operation 420a, third-party configuration removal unit 146 may remove existing configuration with previous carrier network 2 based on configuration removal template associated with ID of carrier network 2 stored in SKU element 220 of connected device 210.

In example operation 430a, deploying unit 142 may deploy configuration with carrier network 1 based on deployment template(s) associated with carrier network 1.

Referring to FIG. 4b, another example operation flow of example operation 340 may be illustrated. In example operation 410b, subscription determination unit 110 may determine that connected device 210 includes a new version of subscription with a service provider, updated from a previous version of existing subscription with the service provider.

In example operation 420b, deploying unit 142 may deploy updated configuration with the service provider based on updated deployment template(s) associated with the service provider.

Example operation 420b may also include reconfiguration unit 144 removing some of the existing configuration to facilitate the deployment of the updated configuration.

Referring to FIG. 4c, another example detailed operation flow of example operation 340 may be illustrated. In example operation 410c, subscription determination unit 110 may determine that connected device 210 terminates a previous subscription with a service provider, which system 10 is associated with.

In example operation 420c, reconfiguration unit 144 may reconfigure connected device 210 based on a reconfiguration template associated with the service provider. The reconfiguration may include removing some of the existing configurations with the service provider and maintain some other configurations and/or deploy some new configurations for purposes of, e.g., enabling connected device 210 to be ready to install a new configuration with a third-party service provider.

The processes described above in association with FIGS. 3-4 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. In other embodiments, hardware components perform one or more of the operations. Such hardware components may include or be incorporated into processors, application-specific integrated circuits (ASICs), programmable circuits such as field programmable gate arrays (FPGAs), or in other ways. The order in which the operations are described is not intended to be construed as a limitation, and any number of the described operations can be combined in any order and/or in parallel to implement the processes.

The memory may include computer readable media such as a volatile memory, a Random Access Memory (RAM), and/or non-volatile memory, e.g., Read-Only Memory (ROM) or flash RAM, and so on. The memory is an example of a computer readable medium.

Computer readable media include non-volatile, volatile, mobile and non-mobile media, and can implement information storage through any method or technology. The information may be computer readable instructions, data structures, program modules or other data. Examples of storage media of a computer include, but not limited to, Phase-change RAMs (PRAMs), Static RAMs (SRAMs), Dynamic RAMs (DRAMs), other types of RAMs, ROMs, Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, and can be used for storing information accessible to the computation device. According to the definitions herein, the computer readable media exclude transitory media, such as modulated data signals and carriers.

It should be further noted that, the terms "include", "comprise", or any variants thereof are intended to cover a non-exclusive inclusion, such that a process, a method, a product, or a device that includes a series of elements not only includes such elements but also includes other elements not specified expressly, or may further include inherent elements of the process, method, product, or device. In the absence of more restrictions, an element limited by "include a/an . . . " does not exclude other same elements existing in the process, method, product, or device that includes the element.

Described above are merely the examples of the present application, which are not used to limit the present application. For those skilled in the art, the present application may have various alterations and changes. Any modification, equivalent replacement, improvement, and the like made within the spirit and principle of the present application shall be included in the scope of the claims of the present application.

What is claimed is:

1. A computer implemented method, comprising:
   detecting an updated subscription status of a connected device with respect to a first service provider;
   identifying a configuration template associated with an identification of the first service provider by selecting, among a plurality of templates stored in a stock keeping unit (SKU) element included in the connected device, a deploying template based on a possibility of conflict of the deploying template against a remaining portion of a previous configuration of the connected device, the remaining portion of the previous configuration being at least partially stored in the connected device; and
   configuring the connected device with the first service provider based on the deploying template.

2. The method of claim 1, further comprising at least partially removing an existing configuration of the connected device with a second service provider based on a configuration removal template associated with an identification of the second service provider, the configuration removal template being stored in the SKU element included in the connected device.

3. The method of claim 1, wherein the configuration template includes a first template for configuring the connected device with the first service provider and a second template for removing an existing configuration of the connected device with the first service provider.

4. The method of claim 1, wherein the configuration template includes a configuration removal template configured as a basis for a third party to remove an existing configuration of the connected device with the first service provider.

5. The method of claim 1, wherein the configuration template associated with the identification of the first service provider includes multiple configuration templates including varied contents and access control measures.

6. The method of claim 1, wherein the configuration template is configured to be updateable by the first service provider.

7. The method of claim 1, wherein the configuring the connected device with the first service provider based on the deploying template includes automatically activating an application program interface (API) to enable a configuration application of the first service provider to configure the connected device with the first service provider based on the updated subscription status.

8. The method of claim 1, wherein the configuring the connected device with the first service provider is performed by an application installed locally on the connected device.

9. The method of claim 1, wherein the SKU element of the connected device stores identifications of multiple service providers.

10. The method of claim 1, wherein the configuring the connected device with the first service provider includes enabling the connected device to communicate with another device over a carrier network of the first service provider.

11. The method of claim 1, further comprising partially removing, by a system affiliated with the first service provider, the previous configuration of the connected device from the connected device, the previous configuration being a configuration of the connected device with a second service provider that is different from the first service provider.

12. A computing system, comprising:
one or more processors;
memory; and
a plurality of programming instruction stored on the memory and executable by the one or more processors to implement:
a subscription detection unit operable to detect an updated subscription status of a connected device with respect to a first service provider;
a template determination unit operable to identify a configuration template associated with an identification of the first service provider by selecting, among a plurality of templates stored in a stock keeping unit (SKU) element included in the connected device, a deploying template based on a possibility of conflict of the deploying template against a remaining portion of a previous configuration of the connected device, the remaining portion of the previous configuration being at least partially stored in the connected device; and
a configuration unit operable to configure the connected device with the first service provider based on the deploying template.

13. The system of claim 12, wherein the system includes a client side subsystem residing on the connected device and a server side subsystem residing on a server of the first service provider.

14. The system of claim 12, wherein the configuration unit further includes a reconfiguration unit operable to at least partially remove an existing configuration of the connected device with a second service provider based on a configuration removal template associated with an identification of the second service provider, the configuration removal template being stored in the SKU element included in the connected device.

15. The system of claim 12, wherein the configuration template includes a first template for configuring the connected device with the first service provider and a second template for removing an existing configuration of the connected device with the first service provider.

16. The system of claim 12, wherein the configuration template associated with the identification of the first service provider includes multiple configuration templates including varied contents and access control measures.

17. The system of claim 12, further comprising a template update unit operable to update the configuration template based on an input from the first service provider.

18. The system of claim 12, wherein the configuring the connected device with the first service provider based on the deploying template includes automatically activating an application program interface (API) to enable a configuration application of the first service provider to configure the connected device with the first service provider based on the updated subscription status.

19. A server, comprising:
one or more processing units;
memory; and
a plurality of programming instruction stored on the memory and executable by the one or more processing units to perform operations including:
detecting an updated subscription status of a connected device with respect to a service provider;
identifying a configuration template associated with an identification of the service provider by selecting, among a plurality of templates stored in a stock keeping unit (SKU) element included in the connected device, a deploying template based on a possibility of conflict of the deploying template against a remaining portion of a previous configuration of the connected device, the remaining portion of the previous configuration being at least partially stored in the connected device; and
configuring the connected device with the first service provider based on the deploying template.

* * * * *